(12) United States Patent
Hinnegan

(10) Patent No.: US 10,168,177 B2
(45) Date of Patent: Jan. 1, 2019

(54) NAVIGATION SYSTEM WITH DESTINATION ACTION MECHANISM AND METHOD OF OPERATION THEREOF

(71) Applicant: Telenav, Inc., Sunnyvale, CA (US)

(72) Inventor: John Hinnegan, Santa Monica, CA (US)

(73) Assignee: Telenav, Inc., Santa Clara, CA (US)

(*) Notice: Subject to any disclaimer, the term of this patent is extended or adjusted under 35 U.S.C. 154(b) by 189 days.

(21) Appl. No.: 14/485,587

(22) Filed: Sep. 12, 2014

(65) Prior Publication Data

US 2016/0076906 A1    Mar. 17, 2016

(51) Int. Cl.
*G01C 21/36* (2006.01)
*G01C 21/26* (2006.01)
*G01C 21/34* (2006.01)

(52) U.S. Cl.
CPC ......... *G01C 21/3697* (2013.01); *G01C 21/26* (2013.01); *G01C 21/3415* (2013.01); *G01C 21/3484* (2013.01); *G01C 21/36* (2013.01)

(58) Field of Classification Search
CPC .... G01C 21/3697; G01C 21/26; G01C 21/36; G01C 21/3415; G01C 21/3484
USPC ....................................................... 701/408
See application file for complete search history.

(56) References Cited

U.S. PATENT DOCUMENTS

| 8,458,102 B2 | 6/2013 | Bill | |
|---|---|---|---|
| 2002/0072356 A1* | 6/2002 | Yamashita | H04M 1/72533 455/420 |
| 2008/0103686 A1* | 5/2008 | Alberth | G01C 21/00 701/532 |
| 2009/0105940 A1* | 4/2009 | Bitan | G01C 21/3415 701/533 |
| 2011/0125398 A1* | 5/2011 | Bos | G01C 21/3611 701/465 |
| 2011/0231020 A1* | 9/2011 | Ramachandran | G05D 23/1905 700/278 |
| 2013/0263745 A1* | 10/2013 | Bombeck | A47J 31/20 99/293 |
| 2014/0309789 A1* | 10/2014 | Ricci | B60Q 1/00 700/276 |

FOREIGN PATENT DOCUMENTS

EP    2458330 A2    5/2012
JP    2012189427 A  * 10/2012

OTHER PUBLICATIONS

Wikipedia, GPS Navigation Device, Sep. 2013, Wikipedia, The Free Encyclopedia.*
English Translation: Nishiura, JP-2012189427-A, Oct. 2012, Japanese Patent Office Publication (Year: 2012).*

* cited by examiner

*Primary Examiner* — Nadeem Odeh
(74) *Attorney, Agent, or Firm* — Perspectives Law Group, Corp.

(57) ABSTRACT

A method of operation of a navigation system includes: calculating a travel route to an expected destination for displaying on a device; determining a destination action for execution at the expected destination; detecting a route deviation from the travel route; determining a deviation type of the route deviation; and generating an action modification based on the route deviation type.

20 Claims, 5 Drawing Sheets

NAVIGATION SYSTEM WITH DESTINATION ACTION MECHANISM AND METHOD OF OPERATION THEREOF

TECHNICAL FIELD

The present invention relates generally to a navigation system, and more particularly to a system with destination action mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, other points of interest (POI), the current location of the user. The real-time information provides invaluable relevant information, such as estimated travel time to a destination, or alternate available routes, and traffic conditions.

However, a navigation system without deviation based destination action control mechanism has become a paramount concern for the consumer. The inability decreases the benefit of using the tool.

Thus, a need still remains for a navigation system with destination action mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a navigation system including: a location unit for determining an origin location; and a control unit, coupled to the location unit, configured to: calculate a travel route from the origin location to an expected destination for displaying on a device; determine a destination action for execution at the expected destination; detect a route deviation from the travel route determine a deviation type of the route deviation; and generate an action modification based on the deviation type.

An embodiment of the present invention provides a method of operation of a navigation system, including: calculating a travel route to an expected destination for displaying on a device; determining a destination action for execution at the expected destination; detecting a route deviation from the travel route; determining a deviation type of the route deviation; and generating an action modification based on the route deviation type.

An embodiment of the present invention provides a non-transitory computer readable medium including instructions for operating a navigation system, including: calculating a travel route to an expected destination for displaying on a device; determining a destination action for execution at the expected destination; detecting a route deviation from the travel route; determining a deviation type of the route deviation; and generating an action modification based on the route deviation type.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
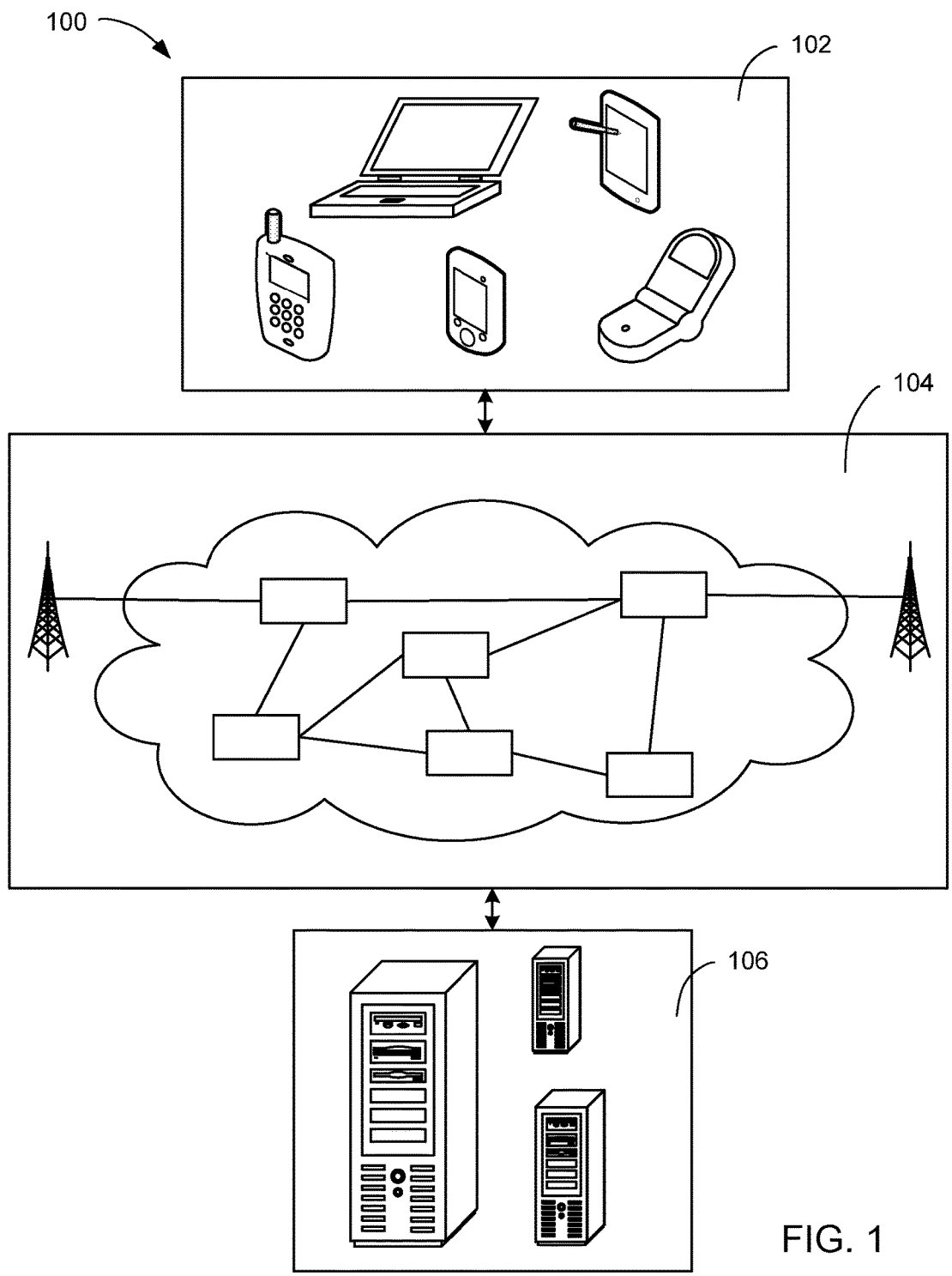
FIG. 1 is a navigation system with destination action mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with destination action mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

The first device 102 can couple to the communication path 104 to communicate with a further device (now shown), such as an electrical appliance or system, for remote operation of the further device. For example, the first device 102 can communicate with the further device at a location, such as a destination location, to initiate or execute a task by remotely operating the further device. These functions will be discussed in greater detail below.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
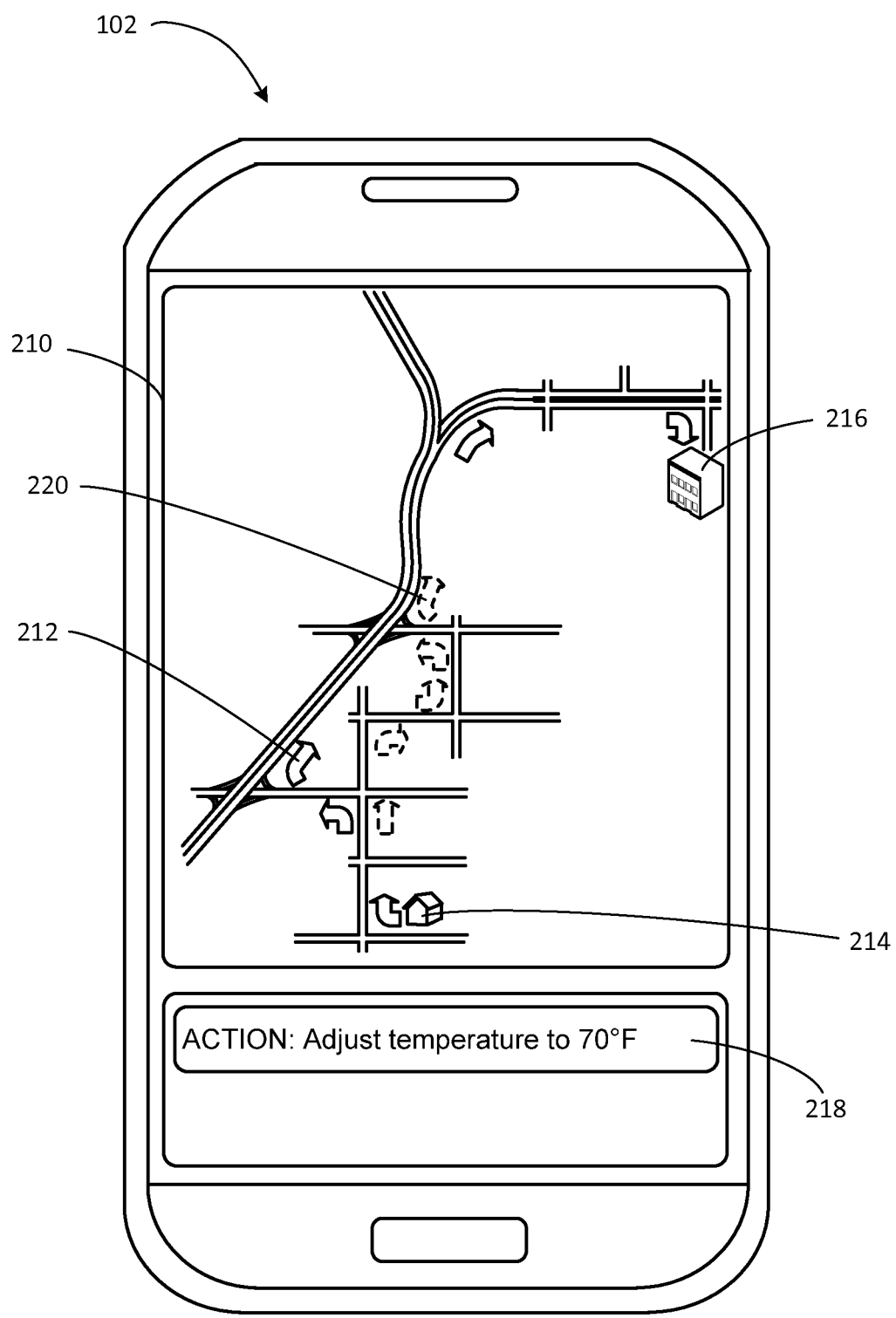
FIG. 2 is an example of a display interface of the first device of FIG. 1.

Referring now to FIG. 2, therein is shown an example of a display interface 210 of the first device 102 of FIG. 1. The display interface 210 depicts a travel route 212 calculated between an origin location 214 and an expected destination 216. The origin location 214 is defined as the initial or starting point of travel along a route to a destination. For example, the origin location 214 can be the physical position of the initial or starting location of the travel route 212, which can be represented as GPS or the longitude and latitude coordinates. In another example, the origin location 214 can be the location of the first device 102 or at a location different from the location of the first device 102 at the time the travel route 212 is generated. For illustrative purposes, the origin location 214 is depicted as a digital or rendered image of a residence, which can be the residence of the user, on the display interface 210.

The expected destination 216 is defined as the end point or destination when traveling along a route. For example, the expected destination 216 can be the physical position or location of the end point of the travel route 212, which can be represented as GPS or the longitude and latitude coordinates. The expected destination 216 can be explicitly or implicitly determined. For example, the expected destination 216 can be implicitly determined such as through a request made by the user. In another example, the expected destination 216 can be implicitly determined through context factors such as time of day or information derived from the user including the schedule of the user or habits and preferences of the user. For illustrative purposes, the expected destination 216 is depicted as a digital or rendered image of a commercial or office building, which can be the office of the user, on the display interface 210.

The travel route 212 is defined as a traversal path from the start location to the destination location. For example, the travel route 212 can be calculated between the origin location 214 and the expected destination 216 based on a number of factors, including shortest distance, the fastest travel time, or the least complicated route. In another example, the travel route 212 can be calculated to account for real time conditions, such as traffic and weather along potential routes between the origin location 214 and the expected destination 216.

The travel route 212 can be a representation of travel path on a map between the origin location 214 and the expected destination 216. The travel route 212 can be depicted in a number of different ways, including a route integrated with a map or an overlay layer on a map. Optionally, the travel route 212 can include or be accompanied by audio or additional visual cues, such as spoken turn-by-turn directions or guidance, text based directions or guidance, or a combination thereof. For illustrative purposes, the travel route 212 is depicted by the solid line arrows.

The navigation system 100 of FIG. 1 can include execution of a destination action 218 at the expected destination 216. The destination action 218 is defined as an action or task associated with arrival at the destination for execution or initiation at the destination. For example, the destination action 218 can be actions to be executed or initiated at the expected destination 216, including environmental control, such as regulation of temperature or lighting, or operating devices, such as alarm systems or appliances. In another example, the destination action 218 can be an action or task to be executed or initiated prior to the arrival of the user at the expected destination 216.

The navigation system 100 can initiate or execute the destination action 218 based on location related factors of first device 102 or the user relative to the expected destination 216. For example, the navigation system 100 can initiate or execute the destination action 218 based on time or distance factors such that the destination action 218 can be completed when arrival at the expected destination 216 is detected. As a specific example, for the destination action 218 of brewing a pot of coffee, the navigation system 100 can determined that completion of the destination action 218 will take 10 minutes and begin the destination action 218 of brewing coffee 10 minutes prior to the user's arrival at the expected destination 216. These functions will be described in greater detail below.

The navigation system 100 can detect a route deviation 220 from the travel route 212. The route deviation 220 is defined as a deviation or detour from a planned or expected route. For example, the route deviation 220 can be a detour from the travel route 212, such as an alternate route to the expected destination 216, a temporary stop at a location along the travel route 212, such as a grocery store or gas station, or travel to a destination different from the expected destination 216, such as a restaurant, hospital, or different office location. The navigation system 100 can modify or adjust the destination action 218 based on the route deviation 220, which is discussed in greater detail below. For illustrative purposes, the route deviation 220, depicted by the dash lined arrows, can be an alternate route type deviation from the travel route 212.

Figure 3:
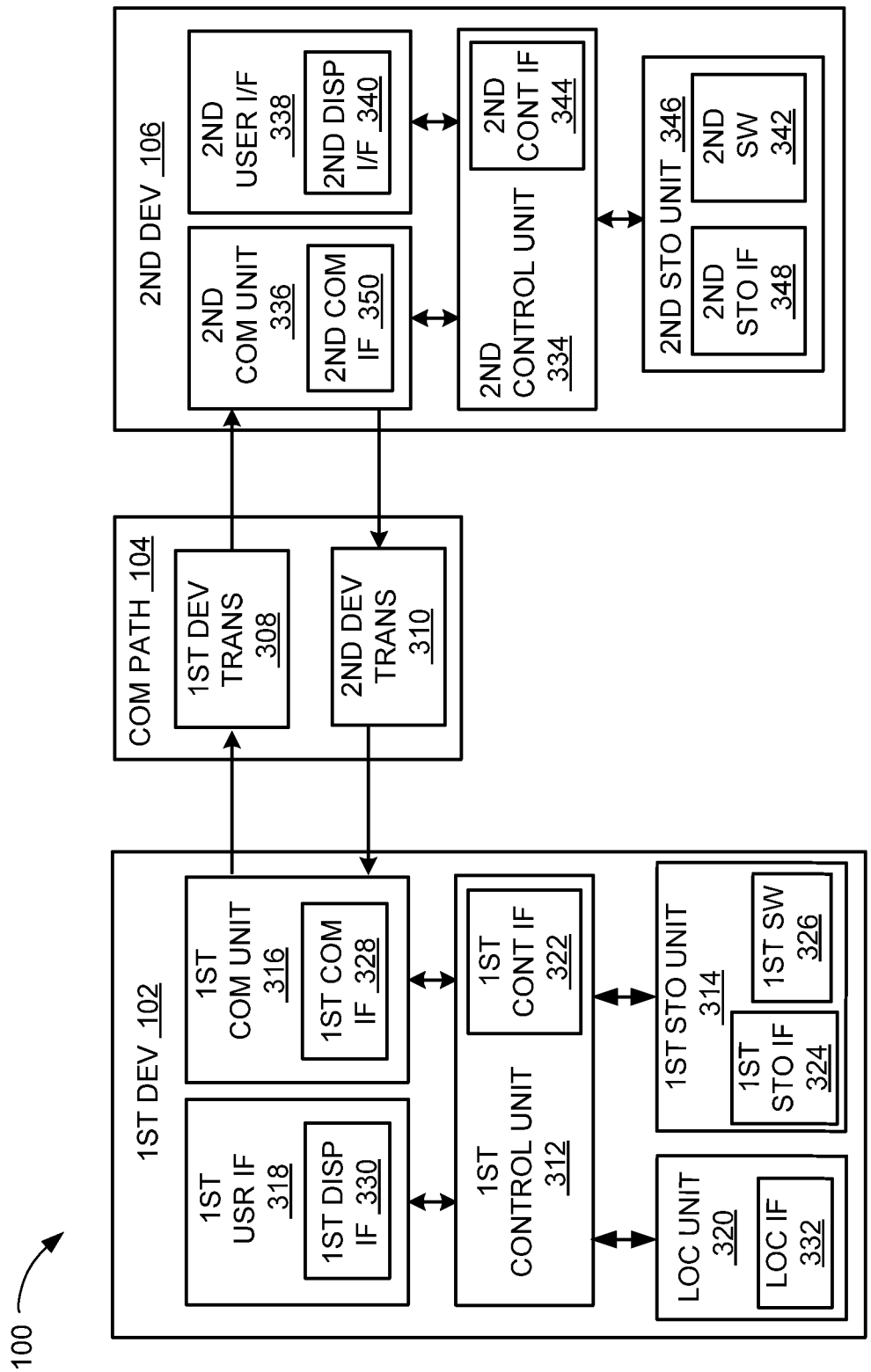
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs. The first user interface 318 can include the display interface 210 of FIG. 2.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
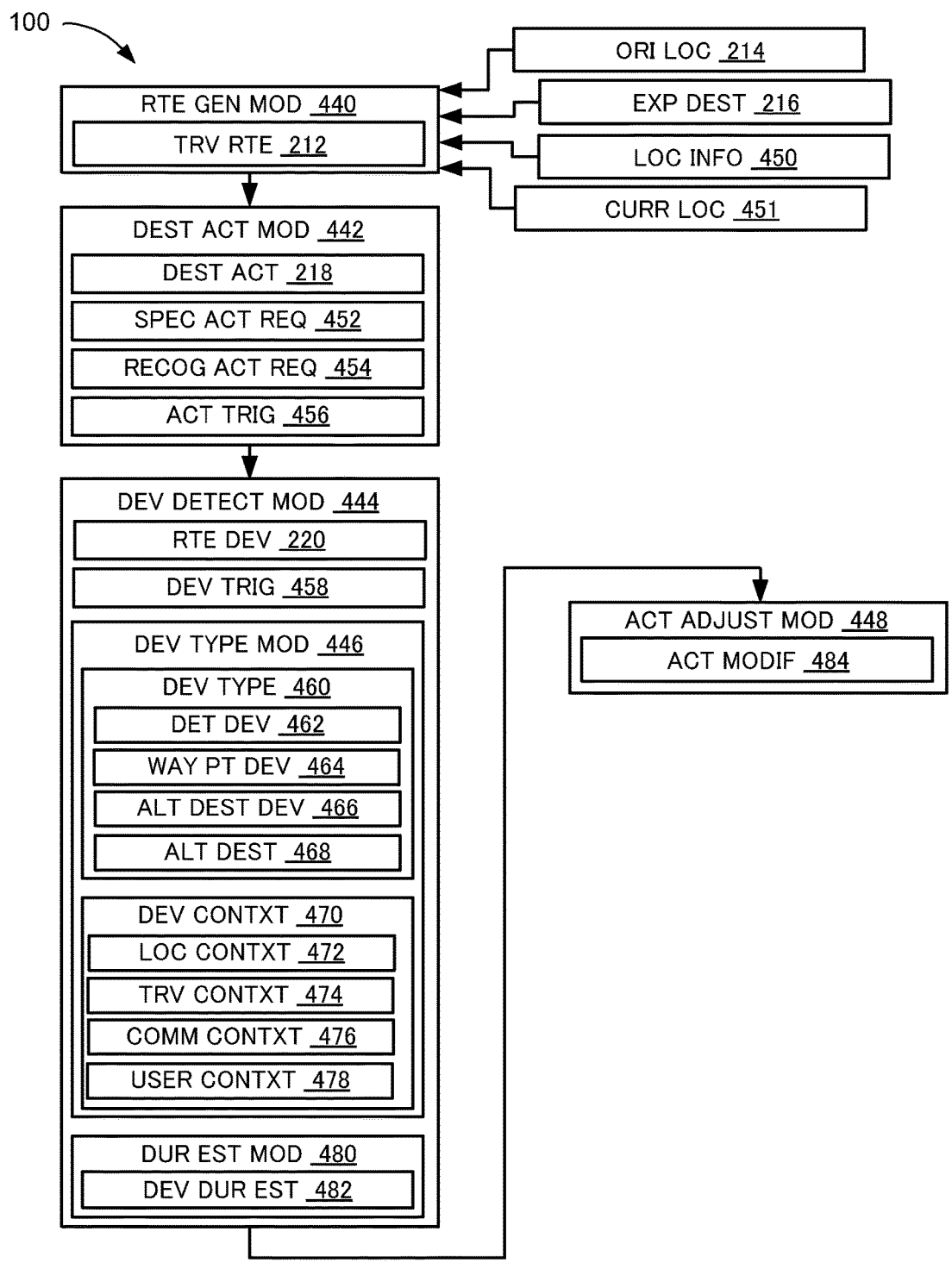
FIG. 4 is a control flow of the navigation system.

Referring now to FIG. 4, therein is shown a control flow of the navigation system 100. The navigation system 100 can include a route generation module 440, a destination action module 442, a deviation detection module 444, and an action adjustment module 448. The destination action module 442 can be coupled to the route generation module 440. The deviation detection module 444 can be coupled to the destination action module 442. The action adjustment module 448 can be coupled to the deviation detection module 444.

The route generation module 440 is for calculating a route from the initial location to the destination. The route generation module 440 can calculate the travel route 212 with location information 450. The location information 450 is defined as information representing a physical position or location in the real world. For example, the location information 450 can be GPS coordinates, longitude and latitude coordinates, a physical address, or a combination thereof associated with a location, such as the origin location 214 and the expected destination 216.

The location information 450 can include a current location 451, which describes the present physical location. The current location 451 can represent the location or position of the first device 102 at a particular instant in time. In general, since the first device 102 is within the possession or within close proximity to the user, such as on the body or inside the vehicle of the user, it is understood that the current location 451 of the user and the first device 102 can be used interchangeably.

The route generation module 440 can determine the location information 450 of the origin location 214, the expected destination 216, or a combination thereof for generating the travel route 212. For example, the route generation module 440 can implement the location unit 320, which can include the capability to calculate GPS coordinates of the first device 102, to determine the location information 450 associated with the origin location 214. In another example, the route generation module 440 can determine the location information 450 of the expected destination 216, such as by accessing the address or coordinates representing the expected destination 216 stored in the first storage unit 314 or implementing the first communication unit 316 for accessing the second storage unit 346 to retrieve the address or coordinates representing the expected destination 216.

The route generation module 440 can calculate the travel route 212 from the origin location 214 to the expected destination 216 with the location information 450. For example, the route generation module 440 can calculate the travel route 212 from the location information 450 representing the origin location 214 to the location information 450 representing the expected destination 216 based on distance, travel time, user preferences, or a combination thereof. As a specific example, the travel route 212 can be calculated to cover the shortest distance between the origin location 214 and the expected destination 216. In specific another example, the travel route 212 can be calculated for the shortest travel duration from the origin location 214 to the expected destination 216.

The navigation system 100 can execute or initiate the destination action 218 at the expected destination 216 with the destination action module 442. The destination action module 442 is for determining the actions or tasks associated with arrival at a destination and execution or initiation of the action or tasks at the destination. The destination action 218 can include tasks associated with arrival of the user at the expected destination 216. As described in the examples of FIG. 2 above, the destination action 218 can include, but is not limited to, temperature control, lighting adjustment, device operation, such as alarm systems and coffee pot operation.

The destination action module 442 can determine the destination action 218 in a number of different ways. For example, the destination action 218 can be explicitly determined through a specified action request 452. The specified action request 452 is defined as an explicit instruction or request by the user to perform an action at a destination. The specified action request 452 can be based on actions by the user, such as predetermined or preset user defined commands or instructions received by the navigation system 100. As a specific example, the specified action request 452 can be a programmed task list or instruction to perform the destination action 218 that can include commands to brew coffee, turn on lights, or adjust the thermostat.

In another example, the destination action module 442 can implicitly determine the destination action 218 through a recognized action request 454. The recognized action request 454 is defined as a learned or recognized instruction to perform an action at a destination. For example, the recognized action request 454 can be a destination action 218 determined by the destination action module 442 such as through pattern recognition based on the behavior or actions of the user. As a specific example when the user regularly sets the thermostat at a particular temperature upon arrival at the expected destination 216, the destination action module 442 can determine the recognized action request 454 should include the destination action 218 of thermostat control to adjust the temperature at the expected destination 216 prior to the arrival of the user.

The destination action module 442 can initiate or execute the destination action 218 based on an action trigger 456. The action trigger 456 is defined as threshold or criteria that determines when the action or task at the destination should be executed or initiated. As an example, the destination action module 442 can execute or initiate the destination action 218 when the criteria or threshold of the action trigger 456 is met. As a further example, the action trigger 456 can be a proximity or temporal trigger based on the location of the user when traveling along the travel route 212.

For example, the criteria or threshold of the action trigger 456 can be a distance or proximity based trigger measured from the expected destination 216, such as when the current location 451 of the user or the first device 102 comes within a specific or predetermined distance of the expected destination 216. As a specific example, the destination action 218 of unlocking a door or disarming an alarm system can be initiated or executed by the navigation system 100 when the current location 451 of the user proximity or predetermined distance of the action trigger 456.

In another example, the action trigger 456 can be a temporal trigger based on an estimated time of arrival to the expected destination 216. In a further example, the action trigger 456 can be a temporal trigger based on the completion time of the destination action 218 such that the destination action 218 will be completed when the user arrives at the expected destination 216. As a specific example, the action trigger 456 can be the calculated completion time for the destination action 218, such as the time necessary to complete the brewing of coffee or for the temperature at the expected destination 216 to reach the temperature set point of the destination action 218.

In the above examples, the destination action module 442 can initiate the destination action 218 when the criteria of the action trigger 456 is met or satisfied. For instance, the destination action module 442 can initiate or execute the destination action 218 when the distance between the current location 451 of the user and the expected destination 216 corresponds with the proximity or distance of the action trigger 456. In another instance, the destination action module 442 can calculate the estimated time of arrival based on the current location 451 of the user and can initiate or execute the destination action 218 when the estimated time of arrival corresponds with the temporal trigger of the action trigger 456. In a further instance the destination action module 442 can initiate or execute the destination action 218 prior to the arrival of the user, for example, based on the current location 451 of the first device 102.

The deviation detection module 444 is for detecting a deviation from the route when traveling to the destination. The deviation detection module 444 can detect the route deviation 220 based on a deviation trigger 458. The deviation trigger 458 is defined as a trigger for determining that a deviation from or delay when traveling along a route has occurred. For example, the deviation trigger 458 can be when the current location 451 of the user indicates the user is no longer traveling along the travel route 212, such as when the user takes a path or roadway that deviates or is different from the travel route 212.

In another example, the deviation trigger 458 can include detection of delay during travel along the travel route 212, which can be determined when the current location 451 of the user indicates small or no changes in movement over an extended period of time. The small variations or changes in the current location 451 of the user can be measured, for example, on a scale of feet or yards, and can be determined in conjunction with movement patterns, such as a meandering path, which could correspond to moving through a store or traveling from the vehicle into a building. The extended period of time can be variable or situation based period that would be longer than expected for a given stop or pause along the travel route 212. Examples of the extended period of time can be a period of time that is longer than a signal cycle at a stop light or a period of time to accomplish a task or action during the stop.

For example, the delay detected by the deviation trigger 458 can be an unexpected or unplanned stop, such as a sudden stop along the shoulder of a highway, which can be determined when the speed indication shows that traffic is moving at a rate greater than the rate of movement relative to that of the user. In another example, the delay detected by the deviation trigger 458 can be a scheduled stop at a gas station or grocery store.

The deviation detection module 444 can determine a deviation type 460 of the route deviation 220. The deviation type 460 is defined as a classification of the deviation or detour from the route. The deviation type 460 can include different types or classifications of deviations from the travel route 212 based on factors such as alternate routes taken from the travel route 212 or the duration of delays in reaching the expected destination 216, such as time spent at a location different from the expected destination 216. The deviation type 460 can include a detour deviation 462, a waypoint deviation 464, or an alternate destination deviation 466.

The detour deviation 462 is defined as a change or modification to the travel route 212 when traveling to the expected destination 216. For example, the detour deviation 462 can be an alternate route to the expected destination 216. As a specific example, the detour deviation 462 can be due to an unexpected incident, such as a traffic accident, traffic obstruction, or road construction.

In general, the detour deviation 462 does not significantly increase travel time, travel distance, or a combination thereof to the expected destination 216. As an example, the detour deviation 462 can retain the same or reduce travel time to the expected destination 216, such as when a short cut is taken. In another example, the detour deviation 462 can include minor increases to travel time, travel distance, or a combination thereof to the expected destination 216, such as traveling along side streets to avoid a traffic accident on a highway.

The waypoint deviation 464 is defined as a temporary stop at a location along the travel route 212 when traveling to the expected destination 216. As an example, the waypoint deviation 464 can be a brief stop along the travel route 212, such as a stop at a gas station or grocery store along the travel route 212, prior to continued travel on the travel route 212 to the expected destination 216. As a specific example, the waypoint deviation 464 can be a stop having a duration generally lasting less than an hour. As a further example, the waypoint deviation 464 can include a location that is a short distance or slight detour from the travel route 212, such as a few blocks or a distance of less than a mile from the travel route 212.

In general, the waypoint deviation 464 can be based on whether the destination action 218 will remain relevant after the route deviation 220, before arrival at the expected destination 216, or a combination thereof. Relevancy of the destination action 218 can be determined by whether the destination action 218 can be or needs to be initiated or executed. For example, the destination action 218 may no longer be relevant if the destination action 218 can no longer be performed, does not need to be performed, or is performed by another prior to arrival by the use at the expected destination 216. As a specific example, the destination action 218 of brewing coffee may no longer be relevant if another individual begins brewing coffee before the user can meet the criteria of the action trigger 456 associated with the destination action 218. In another specific example, the destination action 218 of adjusting the temperature may no longer be relevant if the temperature at the expected destination 216 reaches the temperature set point associated with the destination action 218, but without initiation or execution destination action 218.

The alternate destination deviation 466 can be a change in travel to a location different from the expected destination 216 or a significant delay when traveling to the expected destination 216. In general, the alternate destination deviation 466 can be a change to the expected destination 216 such that the user no longer intends to travel to the expected destination 216. For example, the alternate destination deviation 466 can be a change to the expected destination 216, including an unexpected or unplanned change to an alternate destination 468, which is defined as a destination different the expected destination 216, such as a hospital in response to an emergency, or restaurant for dinner. For the alternate destination deviation 466, the significant delay can be when the deviation duration estimation 482 is a length of time that will render execution of the destination action 218 inapplicable, obsolete, untimely, or irrelevant. For example, the deviation duration estimation 482 of the significant delay can be of a duration such that it is no longer necessary to brew coffee because the user will arrive at the expected destination 216 after the morning hours, thus rendering the destination action 218 as no longer relevant.

The deviation detection module 444 can include a deviation type module 446. The deviation type module 446 is for determining the type or category of the deviation from the route. The deviation type module 446 can determine the deviation type 460 based on a deviation context 470. The deviation context 470 is defined as factors that indicate the circumstances associated with the deviation from travel along a route. For example, the deviation context 470 can be factors or information that can be used to determine the cause, type, duration, or a combination thereof of the route deviation 220. The deviation context 470 can include, but is not limited to, a number of different factors, such as a location context 472, a travel context 474, a communication context 476, a user context 478, or a combination thereof.

The location context 472 is defined context factors associated with locations or points of interest near the location of the user while traveling along the route. In particular, the location context 472 can include information pertaining to locations near or around the current location 451 of the user during a stop or pause in travel along the travel route 212. For example, when the navigation system 100 detects that the user has stopped in a parking lot at a location adjacent the travel route 212, the deviation type module 446 can implement the location unit 320 to identify relevant nearby locations or points of interest, such as, but not limited to, a park, gym, gas station, grocery store, or restaurant. In another example, the location context 472 can include other information about the area around the current location 451 of the user during a stop along the travel route 212, such as whether the area is in a rural area in the country side, a residential area, or urban area.

The travel context 474 is defined as context factors related to travel along the route. For example, the travel context 474 can include information about traffic and road conditions, such as accidents, road closures, or road construction. In another example, the travel context 474 can include information about the vehicle of the user. As a specific example, the navigation system 100 can be connected to sensors on the vehicle of the user (not shown) to provide information including, but not limited to, fuel level, tire pressure, or air bag deployment, which can be used to indicate a vehicle malfunction, such as a flat tire, or a vehicle collision.

The communication context 476 is defined as context factors related to communications made or received by the user. The communication context 476 can be derived from analysis of text messages, telephone calls, email messages, or any other communications made or received by the user. For example, the deviation type module 446 can implement text or speech recognition technology to parse or analyze the content of email messages or telephone calls received or made while traveling along the travel route 212. As a specific example, the communication context 476 can include information to indicate an accident or emergency for the user to respond to, such as an unscheduled urgent meeting, a medical emergency, or a reminder for to perform a task that may have been forgotten by the user. In another specific example, the communication context 476 can include information regarding an invitation to an impromptu get together, such as a hang out or meal with friend or family. In a further specific example, the communication context 476 can include communication of a request by others, such as a message to purchase item from a store while enroute to the expected destination 216.

The user context 478 is defined context factors based on personal information associated with user. For example, the user context 478 can include personal habits or patterns, the schedule and appointments, or other personal information related to the user. As a specific example, the user context 478 can include information such as a habit of trips by the user to a golf course or a park for 30 to 45 minutes when traveling form the origin location 214 to the expected destination 216. In another specific example, the user context 478 can include information about the user's habit of going grocery shopping early in the week. In a further specific example, the user context 478 can include information about the user's schedule, such as appointments, tasks and errands.

The deviation detection module 444 can include a duration estimation module 480, coupled to the deviation type module 446. The duration estimation module 480 is for calculating a deviation duration estimation 482 for the route deviation 220. The duration estimation module 480 can calculate the deviation duration estimation 482 based on one or more of the available instances of the deviation context 470. For example, when the travel context 474 indicates that the user is taking an alternate route from the travel route 212 to avoid unexpected traffic, the duration estimation module 480 can calculate the deviation duration estimation 482 as the time it would take the user to reach the expected destination 216 along the alternate route from the current location 451 when the route deviation 220 occurred.

In another example of calculating the deviation duration estimation 482, the deviation context 470 can include: the travel context 474 of information about the user's vehicle, such as low tire pressure or fuel level; the location context 472 of information indicating a stop along the shoulder of busy highway or at a gas station; or a combination thereof. To continue the example, the duration estimation module 480 can infer that the user is stopped to accomplish the task of fixing a flat tire or refueling the vehicle, respectively, and calculate the deviation duration estimation 482 as an estimated time to complete the task.

Similarly, in a further example of calculating the deviation duration estimation 482, the deviation context 470 can include: the location context 472 of information that indicates a stop near a grocery store or a hair salon; the user context 478 of information that indicates a personal reminder to pick up groceries, a calendar appointment for a haircut or that the hair salon is one visited regularly by the user; or a combination thereof. To continue the example, the duration estimation module 480 can infer that the user has stopped to accomplish the task of purchasing groceries or getting a haircut, respectively, and calculate the deviation duration estimation 482 as an estimated time to complete the task.

In yet a further example of calculating the deviation duration estimation 482, the deviation context 470 can include: the communication context 476 of a message about a medical emergency that requests the user to visit a hospital. To continue the example, the duration estimation module 480 can infer that the user may be at the hospital for an indefinite amount of time and calculate the deviation duration estimation 482 as an indefinite period of time.

The deviation type module 446 can determine the deviation type 460 based on analysis of the deviation context 470, the deviation duration estimation 482, or a combination thereof. More specifically, the deviation type module 446 can account for the deviation duration estimation 482 when analyze information from the available instances of the deviation context 470, including the location context 472, the travel context 474, the communication context 476, the user context 478, or a combination thereof, to determine whether the deviation type 460 is the detour deviation 462, the waypoint deviation 464, or the alternate destination deviation 466.

The deviation type module 446, for example, can determine that the deviation type 460 is the detour deviation 462 when the deviation context 470 includes information indicating that the route deviation 220 is an alternate route to the expected destination 216. In a specific example, the deviation context 470 can include the travel context 474 of slow traffic or road construction in combination with the absence of other instances of the deviation context 470, which would indicate that the user intends to take an alternate route to the expected destination 216 in order to avoid the slow traffic or road construction of the travel context 474.

The deviation type module 446 can determine that the deviation type 460 is the waypoint deviation 464 when the deviation context 470 includes information indicating that the user will continue to the expected destination 216 after a brief period at the deviation location, the destination action 218 remains relevant, or a combination thereof. The deviation type 460 can be determined based on one or more instances of the deviation context 470.

For example, the deviation context 470 can include a combination of the location context 472 indicating that the current location 451 of the user is co-located with a gas station and the travel context 474 indicating that the vehicle of the user is low on fuel. To continue the example, the deviation type module 446 can infer from the location context 472 and the travel context 474 that the user is stopped to refuel the vehicle before continuing to the expected destination 216. Since the deviation duration estimation 482 for refueling the vehicle is relatively short, such as a duration of ten minutes or less, the destination action 218 will remain relevant and the deviation type module 446 can determine deviation type 460 as the waypoint deviation 464.

Similarly, in another example, the deviation context 470 includes the user context 478, such as a to-do list action item or scheduled trip to purchase groceries, and the location context 472 indicating that the current location 451 of the user is co-located with a parking lot of a grocery store. To continue the example, the deviation type module 446 can infer from the user context 478 and the location context 472 that the user is stopped to purchase groceries before continuing to the expected destination 216. Since the deviation duration estimation 482 for purchasing groceries is relatively short, such as a duration of half an hour or less, the destination action 218 can remain relevant and the deviation type module 446 can determine deviation type 460 as the waypoint deviation 464.

The deviation type module 446, in an example, can determine that the deviation type 460 is the alternate destination deviation 466 when the deviation context 470 includes information that indicates the user no longer intends to travel along the travel route 212 to the expected destination 216. The deviation type 460 can be determined as the alternate destination deviation 466 based on one or more instances of the deviation context 470, the deviation duration estimation 482, or a combination thereof.

For example, the deviation type module 446 can determine that the deviation type 460 is the alternate destination deviation 466 when the deviation context 470 associated with the route deviation 220 includes the communication context 476 that requests or directs the user to another destination. The communication context 476 in this example can include information that can direct the user away from the travel route 212 to a destination different from that of the expected destination 216, such as a message regarding a medical emergency that directs the user to a hospital; an invitation to join others for a meal at a restaurant; or notification of an unexpected or unplanned meeting.

In another example, the deviation context 470 can include the travel context 474 of sensor information from the user vehicle, such as a rapid loss in tire pressure or airbag deployment, and a communication context 476 such as a telephone call to a road side assistance, vehicle towing service, or emergency services. To continue the example, the deviation type module 446 can infer from the travel context 474 and the communication context 476 that the user vehicle suffered from a flat tire or the user vehicle was involved in a collision, respectively. Since the deviation duration estimation 482 for road side assistance or receiving emergency assistance can be indefinite and can include travel to the alternate destination 468 of a hospital or repair shop, the deviation type module 446 can determine the deviation type 460 as the alternate destination deviation 466.

The navigation system 100 can include the action adjustment module 448. The action adjustment module 448 is for adjusting the action associated with the destination when the route deviation 220 from the travel route 212 is detected. For example, the action adjustment module 448 can generate an action modification 484 based on the deviation type 460. The action modification 484 is defined as an adjustment or change to the destination action 218.

In an example, for the deviation type 460 of the detour deviation 462, the action adjustment module 448 can generate the action modification 484 as an adjustment to the timing, such as advancing, maintaining, or postponing the initiation or execution of the destination action 218. As a specific example, when the detour deviation 462 will lead to a travel time that is approximately similar to the arrival time of travel along the travel route 212 to the expected destination 216, the action adjustment module 448 can generate the action modification 484 as maintaining the destination action 218 without any modifications. In another specific example, when detour deviation 462 will lead to an earlier arrival at the expected destination 216 relative to the originally estimated travel time along the travel route 212, the action adjustment module 448 can advance or accelerate the execution of the destination action 218, such as increasing the rate of temperature adjustment.

In another example, for the deviation type 460 of the waypoint deviation 464, the action adjustment module 448 can generate the action modification 484 as an adjustment to timing, such as a delay or postponement based on the deviation duration estimation 482, or cancellation of the destination action 218. As a specific example, for the waypoint deviation 464 having the deviation duration estimation 482 of 10 minutes to refuel the vehicle or 20 minutes for a stop at a grocery store, the action adjustment module 448 can generate the action modification 484 as a delay corresponding to the deviation duration estimation 482, such as delaying or postponing initiation of the destination action 218 of brewing coffee or adjusting the temperature at the expected destination 216 10 or 20 minutes, respectively. In another specific example, the action adjustment module 448 can generate the action modification 484 of cancellation of the destination action 218 when the deviation duration estimation 482 for the waypoint deviation 464 is of a duration that renders the destination action 218 no longer relevant.

In a further example, for the deviation type 460 of the alternate destination deviation 466, the action adjustment module 448 can generate the action modification 484 as a cancellation of the destination action 218, transfer of the destination action 218 to the alternate destination 468, or generation of new task, such as the alternate location action, at the alternate destination 468. As a specific example, when alternate destination deviation 466 includes traveling to the alternate destination 468 of an off-site meeting rather than the expected destination 216 of the office, the action adjustment module 448 can cancel the destination action 218 of temperature adjustment or brewing coffee.

In another example of the action modification 484 based on the alternate destination deviation 466, the action adjustment module 448 can generate the action modification 484 as a combination of actions at the expected destination 216 and the alternate destination. As a specific example, the action adjustment module 448 can generate the action modification 484 as a transfer of the destination action 218 from the expected destination 216 to the alternate destination 468, such as cancelling the brewing coffee or temperature adjustment at the expected destination 216 and initiating the brewing of coffee or temperature adjustment at the alternate destination 468.

It has been discovered that the generating the action modification 484 based on the route deviation 220 provides improved efficiency in managing the destination action 218 at the expected destination 216. The action modification 484 can improve efficiency by saving energy by delaying or cancelling the execution of the destination action 218 due to the route deviation 220, such as the waypoint deviation 464 and the alternate destination deviation 466.

The first software 326 of FIG. 3 of the first device 102 of FIG. 3 can include the modules for the navigation system 100. For example, the first software 326 can include the route generation module 440, the destination action module 442, the deviation detection module 444, and the action adjustment module 448. The first location unit 320 can be configured to determine the origin location 214, the current location 451, the expected destination 216 or a combination thereof.

The first control unit 312 of FIG. 3 can execute the first software 326 to implement the route generation module 440, the destination action module 442, the deviation detection module 444, and the action adjustment module 448. For example, the first control unit 312 can be configured to calculating the travel route 212 with location information 450 for the origin location 214 and the expected destination 216, respectively. The first control unit 312 can be configured to interface with the first display interface 210 display the travel route 212 on the first device 102.

The first control unit 312 can be configured to implement the destination action module 442 to initiate or execute the destination action 218. For example, the first control unit 312 can use the first communication unit 316 to interface with corresponding device at the expected destination 216 to execute or initiate the destination action 218.

The first control unit 312 can be configured to implement the deviation detection module 444 for detecting the route deviation 220 and the deviation type 460 based on the deviation context 470. For example, the first control unit 312 can implement the first location unit 320 and execute the deviation detection module 444 to detect the route deviation 220. The first control unit 312 can be configured to implement the action adjustment module 448 to generate the action modification 484.

The second software 342 can include the modules for the navigation system 100. For example, the second software 342 can include the route generation module 440, the destination action module 442, the deviation detection module 444, and the action adjustment module 448.

The second control unit 334 of FIG. 3 can execute the second software 342 to implement the route generation module 440, the destination action module 442, the deviation detection module 444, and the action adjustment module 448. For example, the second control unit 334 can be configured to calculating the travel route 212 with location information 450 for the origin location 214 and the expected destination 216, respectively. The second control unit 334 can be configured to interface with the second display interface 210 display the travel route 212 on the device.

The second control unit 334 can be configured to implement the destination action module 442 to initiate or execute the destination action 218. For example, the second control unit 334 can use the second communication unit 336 to interface with corresponding device at the expected destination 216 to execute or initiate the destination action 218.

The second control unit 334 can be configured to implement the deviation detection module 444 for detecting the route deviation 220 and the deviation type 460 based on the deviation context 470. For example, the second control unit 334 can execute the deviation detection module 444 to detect the route deviation 220. The second control unit 334 can be configured to implement the action adjustment module 448 to generate the action modification 484.

The modules of the navigation system 100 can be partitioned between the first software 326 and the second software 342. For example, the first software 326 can include the route generation module 440 and the deviation detection module 444. Based on the size of the first storage unit 314 of FIG. 3, the first software 326 can include additional modules of the navigation system 100. The first control unit 312 can execute the modules partitioned on the first software 326 as previously described. The first control unit 321 can implement the first display interface 210, the location unit 320, the first storage unit 314, or first communication unit 316 as previously described above.

The second software 342 can include the destination action module 442 and the action adjustment module 448. The second control unit 334 can execute modules partitioned on the second software 342 as previously described. The second control unit 334 can implement the second control unit 334 can implement the other hardware units, such as the second display interface 210, the second storage unit 346, or the second communication unit 336 as previously described above.

The navigation system 100 describes the module functions or order as an example. The modules can be partitioned differently. For example, the route generation module 440 can be directly coupled to the deviation detection module 444. Each of the modules can operate individually and independently of the other modules. Furthermore, data generated in one module can be used by another module without being directly coupled to each other. For example, the deviation detection module 444 can receive the current location 451 directly from the route generation module 440.

The modules described in this application can be hardware implementation or hardware accelerators in the first control unit 312 or in the second control unit 334. The modules can also be hardware implementation or hardware accelerators within the first device 102 or the second device 106 but outside of the first control unit 312 or the second control unit 334, respectively.

The physical transformation from meeting the criteria of the action trigger 456 while traveling along the travel route 212 results in the movement in the physical world, such as operation of devices for initiating or executing the destination action 218 at the expected destination 216. As the movement in the physical world occurs, such as the route deviation 220, the movement itself creates additional information that is converted back into the deviation context 470 for generating the action modification 484 for the continued operation of the navigation system 100 and to continue the movement in the physical world.

Figure 5:
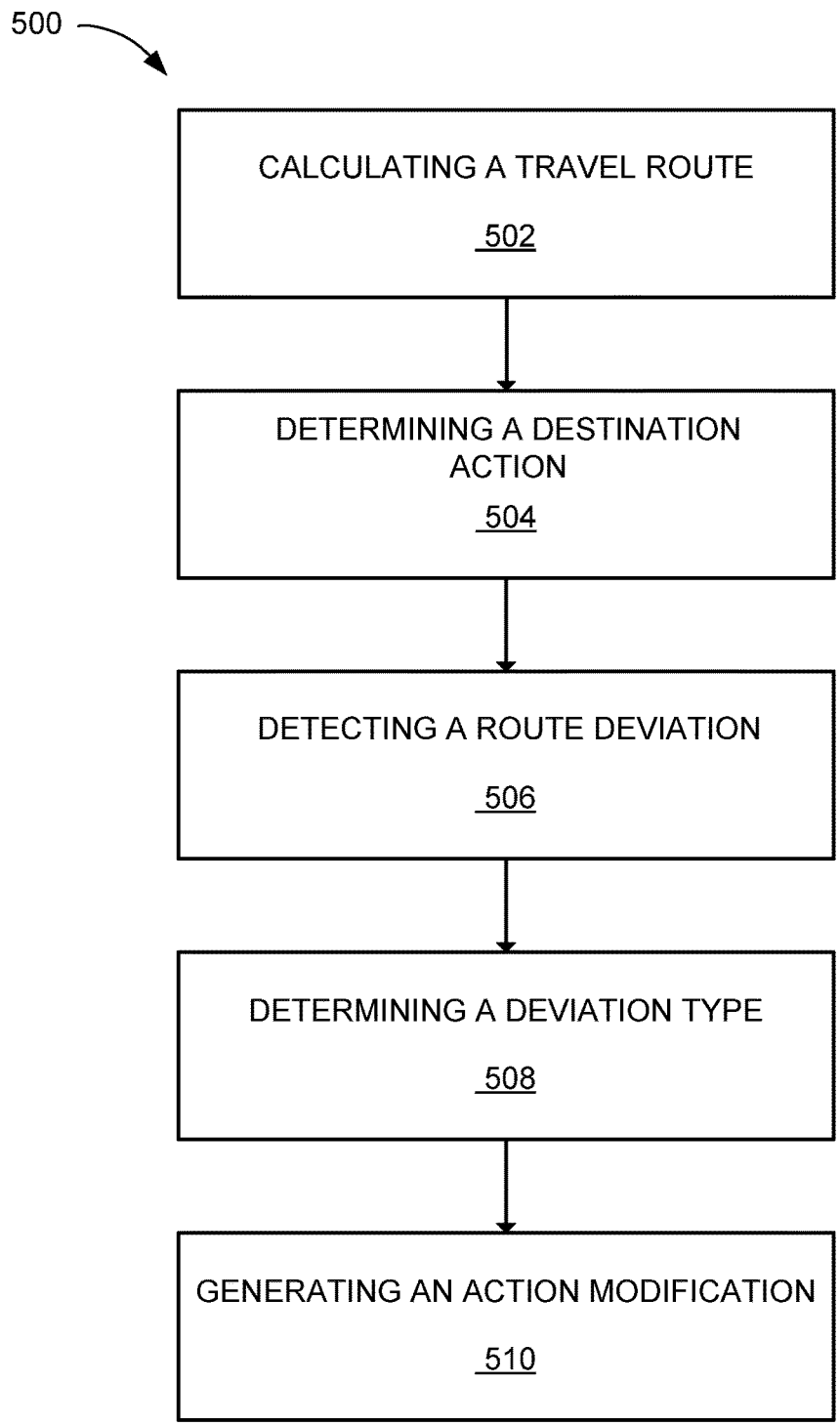
FIG. 5 is a flow chart of a method of operation of the navigation system in a further embodiment of the present invention.

Referring now to FIG. 5, therein is shown a flow chart of a method 500 of operation of the navigation system 100 in a further embodiment of the present invention. The method 500 includes: calculating a travel route to an expected destination for displaying on a device in a block 502; determining a destination action for execution at the expected destination in a block 504; detecting a route deviation from the travel route in a block 506; determining a deviation type of the route deviation in a block 508; and generating an action modification based on the route deviation in a block 510.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A navigation system comprising:
a control unit, including a processor, configured to:
 receive an origin location of a user device;
 calculate a travel route from the origin location to an expected destination;
 determine a destination action for execution by a destination device at the expected destination;
 detect a route deviation from the travel route;
 determine a deviation type of the route deviation based on analysis of a communication context of a communication received by a user of the user device as the cause for the route deviation, wherein the communication received is from a different user and the analysis of the communication context includes one of text recognition or speech recognition of a content of the communication;
 generate an action modification as an adjustment to the destination action based on the deviation type; and
a communication unit, coupled to the control unit, configured to:
 interface with the destination device to execute the destination action adjusted by the action modification.

2. The system as claimed in claim 1 wherein the control unit is configured to determine the deviation type based on a deviation context, including a location context, a travel context, the communication context, a user context, or a combination thereof.

3. The system as claimed in claim 1 wherein the control unit is configured to determine the deviation type based on a deviation duration estimation.

4. The system as claimed in claim 1 wherein the control unit is configured to determine the deviation type as a detour deviation, a waypoint deviation, or an alternate location deviation.

5. The system as claimed in claim 1 wherein the control unit is configured to calculate a deviation duration estimation associated with the route deviation based on a deviation context.

6. The system as claimed in claim 1 wherein the control unit is configured to generate the action modification including generation of the destination action for an alternate destination.

7. The system as claimed in claim 1 wherein the control unit is configured to generate the action modification as a delay to the destination action.

8. The system as claimed in claim 1 wherein the control unit is configured to detect the route deviation based on a deviation trigger.

9. The system as claimed in claim 1 wherein the control unit is configured to determine the destination action based on a recognized action request.

10. The system as claimed in claim 1 wherein the control unit is configured to determine the destination action based on a specified action request.

11. A method of operation of a navigation system comprising:
determining an origin location for a user device as global positioning system coordinates with a location unit of the user device, wherein the location unit includes the capability to calculate global positioning system coordinates;
calculating a travel route from the origin location to an expected destination;
determining a destination action for execution by a destination device at the expected destination;
detecting a route deviation from the travel route;
determining a deviation type of the route deviation based on analysis of a communication context of a communication received by a user of the user device as the cause for the route deviation, wherein the communication received is from a different user and the analysis of the communication context includes one of text recognition or speech recognition of the content of the communication;
generating an action modification as an adjustment to the destination action based on the route deviation type; and
interfacing with the destination device to execute the destination action adjusted by the action modification.

12. The method as claimed in claim 11 wherein determining the deviation type includes determining the deviation type based on a deviation context, including a location context, a travel context, the communication context, a user context, or a combination thereof.

13. The method as claimed in claim 11 wherein determining the deviation type includes determining the deviation type based on a deviation duration estimation.

14. The method as claimed in claim 11 wherein determining the deviation type includes determining the deviation type as a detour deviation, a waypoint deviation, or an alternate location deviation.

15. The method as claimed in claim 11 further comprising calculating a deviation duration estimation associated with the route deviation based on a deviation context.

16. A non-transitory computer readable medium including instructions for operating a navigation system, the instructions comprising:
   determining an origin location for a user device as global positioning system coordinates with a location unit of the user device, wherein the location unit includes the capability to calculate global positioning system coordinates;
   calculating a travel route from the origin location to an expected destination;
   determining a destination action for execution by a destination device at the expected destination;
   detecting a route deviation from the travel route,
   determining a deviation type of the route deviation based on analysis of a communication context of a communication received by a user of the user device as the cause for the route deviation, wherein the communication received is from a different user and the analysis of the communication context includes one of text recognition or speech recognition of a content of the communication;
   generating an action modification as an adjustment to the destination action based on the route deviation type, and
   interfacing with the destination device to execute the destination action adjusted by the action modification.

17. The non-transitory computer readable medium as claimed in claim 16 wherein determining the deviation type includes determining the deviation type based on a deviation context, including a location context, a travel context, the communication context, a user context, or a combination thereof.

18. The non-transitory computer readable medium as claimed in claim 16 wherein determining the deviation type includes determining the deviation type based on a deviation duration estimation.

19. The non-transitory computer readable medium as claimed in claim 16 wherein determining the deviation type includes determining the deviation type as a detour deviation, a waypoint deviation, or an alternate location deviation.

20. The non-transitory computer readable medium as claimed in claim 16 further comprising calculating a deviation duration estimation associated with the route deviation based on a deviation context.

* * * * *